United States Patent
Park

(10) Patent No.: US 11,912,839 B2
(45) Date of Patent: Feb. 27, 2024

(54) HOT MELT FILM CONTAINING BIOMASS-BASED THERMOPLASTIC POLYURETHANE RESIN

(71) Applicant: SAM BU FINE CHEMICAL CO., LTD., Gimhae-si (KR)

(72) Inventor: Heedae Park, Busan (KR)

(73) Assignee: SAM BU FINE CHEMICAL CO., LTD., Gimhae-si (KR)

( * ) Notice: Subject to any disclaimer, the term of this patent is extended or adjusted under 35 U.S.C. 154(b) by 0 days.

(21) Appl. No.: 17/994,272

(22) Filed: Nov. 25, 2022

(65) Prior Publication Data

US 2023/0167253 A1 Jun. 1, 2023

(30) Foreign Application Priority Data

Nov. 29, 2021 (KR) .................. 10-2021-0166594

(51) Int. Cl.
*C08G 18/72* (2006.01)
*C08J 5/18* (2006.01)
*C08K 3/36* (2006.01)

(52) U.S. Cl.
CPC ............ *C08J 5/18* (2013.01); *C08G 18/72* (2013.01); *C08K 3/36* (2013.01); *C08J 2375/08* (2013.01); *C08K 2201/011* (2013.01)

(58) Field of Classification Search
CPC ......... C08G 18/72; C08J 5/18; C08J 2375/08; C08K 3/36; C08K 2201/011
USPC ...................................................... 524/590
See application file for complete search history.

(56) References Cited

FOREIGN PATENT DOCUMENTS

| CA | 2874111 A1 | * | 12/2013 | ............. C08G 18/42 |
| CN | 1757694 A | * | 4/2006 | ............. C08G 18/12 |
| CN | 110680142 A | * | 1/2020 | |
| JP | 2019-519659 A | | 7/2019 | |
| KR | 10-0865692 B1 | | 10/2008 | |
| KR | 10-2014-0147631 A | | 12/2014 | |
| KR | 10-2015-0005092 A | | 1/2015 | |
| KR | 10-1905957 B1 | | 10/2018 | |
| KR | 10-1915407 B1 | | 11/2018 | |
| KR | 10-1938526 B1 | | 1/2019 | |
| KR | 10-2057036 B1 | | 12/2019 | |
| WO | 2018 005538 A2 | | 1/2018 | |

* cited by examiner

*Primary Examiner* — Kelechi C Egwim
(74) *Attorney, Agent, or Firm* — GOLDILOCKS ZONE IP LAW

(57) ABSTRACT

The present invention relates to a hot melt film containing a biomass-based thermoplastic polyurethane resin, and is not only environmentally friendly to the human body as it contains a biomass-based thermoplastic polyurethane resin prepared by reacting a biomass-derived polyol with a diol-based chain extender and diisocyanate in a range of 20-70% by weight, accordingly, by containing hydrophobic nano-silica, it is possible to secure properties such as excellent high heat resistance, elasticity, uniform adhesion strength, and excellent durability at the petroleum-based level, and also provides a hot melt film containing a biomass-based thermoplastic polyurethane resin that can prevent overflow during the bonding process and improve the weight and texture of the product.

5 Claims, No Drawings

HOT MELT FILM CONTAINING BIOMASS-BASED THERMOPLASTIC POLYURETHANE RESIN

CROSS-REFERENCE TO RELATED APPLICATION

The present application claims priority under 35 U.S.C. § 119 to Korean Patent Application No. 10-2021-0166594 filed on Nov. 29, 2021 in the Korean Intellectual Property Office, the disclosure of which is incorporated herein by reference in its entirety.

BACKGROUND

The present invention relates to a hot melt film containing a biomass-based thermoplastic polyurethane resin, and more particularly, as it contains a thermoplastic polyurethane resin having a biomass content of about 20 to 70%, it is not only friendly to the environment and human body, but also to the hydrophobic nano-silica is formulated to secure physical properties such as excellent high heat resistance, elasticity, uniform adhesive strength and excellent durability at the petroleum level when adhering to adherends such as electronic product housings, home interior products, functional clothing, and shoes.

As hydrophobic nano-silica is formulated, when adhering to adherends such as electronic product housings, home interior products, functional clothing, and shoes, it can secure physical properties such as excellent high heat resistance, elasticity, uniform adhesive strength and excellent durability at the petroleum level.

In addition, it relates to a hot melt film containing a biomass-based thermoplastic polyurethane resin capable of preventing an overflow phenomenon during the bonding process and improving the weight and feel of the product.

BACKGROUND TECHNOLOGY

In recent years, as in all industries, various industries such as shoes, clothing, and bags are making efforts to reduce manufacturing costs. As part of this, attempts have been made to reduce or eliminate the sewing process, which requires a lot of manpower during the manufacturing process.

In this way, by replacing the sewing process, which takes up a considerable part of the product manufacturing cost with an adhesive process, i.e., bonding process, it is intended to reduce the cost by increasing the output per person and shortening the process time.

In this adhesive process, a liquid adhesive is applied to an adherend (hereinafter, referred to as a 'fabric'), and the fabrics are adhered to each other in a state in which a solvent or moisture is volatilized through drying.

This adhesive process has an advantage over the sewing process in that the process time and the number of workers can be reduced. However, efforts to reduce manufacturing costs are not limited to this adhesive process, and a process has further been applied, in which fabrics are adhered to each other by heat pressing using a film-type hot melt (hereinafter referred to as "thermoplastic hot melt film") instead of using a liquid-state adhesive.

Thermoplastic hot melt films are used in the footwear manufacturing field due to their environmentally friendly characteristics and convenience of use and for the purpose of reducing costs, and examples thereof include thermoplastic polyurethane (TPU) hot melt films, polyamide hot melt films, ethylene-vinyl acetate (EVA) hot melt films, polyester hot melt films, and the like. Among these films, TPU hot melt films and EVA hot melt films are mainly used. These thermoplastic hot melt films have advantages in that they show good productivity due to their film extrusion workability, are environmentally friendly due to being free of solvent, and have excellent bonding strength and selecting a material with a good touch feel is suitable to secure adhesion with various fabrics such as engineered mesh, sandwich mesh, lining fabric, etc.

However, since the conventional thermoplastic hot melt film is usually manufactured to a thickness of 0.2 mm or more in order to secure a stable adhesive force, when the hot melt film is sandwiched between fabrics and placed, No-Sew Press, an overflow phenomenon frequently occurs. In addition, the fabric product is not only a lot of feeling that the overall weight is heavy, but also feels harder, and there is a disadvantage that does not meet the development trend of lighter weigh fabric.

The conventional hot melt film has a problem that the thickness of the film is 0.2 mm or more, in addition, if a press operation, No-Sew Press, is performed with the hot melt film inserted between the fabric and the fabric, the amount of the hot melt film is biased toward the fabric with the larger hole diameter, leading to a large amount of hot melt film. There is a problem in that the hot melt film does not exist on the adhesive interface, resulting in poor adhesion in the end.

That is, when a fabric with a large weaving hole size is bonded to a fabric with a small weaving hole, or a fabric with a high yarn texture and a fabric with a low fabric density, and when different types of fabrics are bonded with a hot melt film, the hot melt film is too biased to one side of the fabric due to heat and pressure.

This is because the hot melt film melts and flows into the fabric with a large hole size or the fabric with a low yarn density, so that the hot melt film does not remain on the remaining adhesive interface of the fabric.

In order to solve the above problems, the present inventor disclosed a lower layer made of any one of a release film or a release paper; a solvent-type liquid resin layer applied to the upper surface of the lower layer; and a non-solvent type hot melt film layer applied on the upper surface of the resin layer in Korean Patent No. 10-0865692. In order to improve a hot melt film including a thermoplastic polyurethane through research as presented in Korean Patent Publication Nos. 10-2014-0147631 and 10-2015-0005092, A manufacturing method of hot melt film was developed.

In addition, a manufacturing method for polyurethane hot melt film was developed through Korean Patent Nos. 10-1905957 and 10-1915407, polyester polyols with a number average molecular weight of 4,000 or more are used, while aliphatic isocyanates and amines are used as chain extenders. Here, a water-soluble polyurethane adhesive polymerized by using ethoxylated polypropylene oxide as a surfactant and rosin as a tackifier and reacting them is coated on a hot melt film with a thickness of 20 μm or less to obtain an adhesive function.

Also polyurethane resin; Dimethylpyrazole (DMP) type isocyanate blocking agent; 2,4-pentanedione; and a composition of a reactive hot melt resin containing nano-silica has been developed.

In addition, in Korean patent No. 10-1938526 developed by the present inventor, by using a thermoplastic hot melt film, for shoes, including 0.1 to 5.0 phr of nano-silica in any one resin composition selected from thermoplastic polyurethane (TPU), ethylene vinyl acetate (EVA), polyamide, and polyester even when the fabric has a high or low density of yarn structure or a large or small diameter of a fabric weaving hole during press bonding (No-Sew Press), the hot melt film is formed by heat and pressure. It was found that the adhesive strength of the hot melt film could be increased by uniformly distributing the hot melt film on the surface of the fabric without being biased to one side of the fabric.

And in Korean Patent No. 10-2057036, by mixing nano-silica with surface-modified hydrophobic nano-silica, in addition to the advantages of existing patents, it is possible to manufacture a thinner hot melt film, saving material cost and energy, and a press molding is possible to improve productivity, it was confirmed that the fabric to which this was applied was not only light and soft to the touch, but also improved the quality of the product by completely improving the overflow phenomenon, which was a problem in the bonding process.

RELATED ARTS

Patent Documents

Patent Document 1: Korean Patent No. 10-0865692, entitled "hot melt film and the manufacture method thereof" issued on Oct. 28, 2008;
Patent Document 2: Korean Patent Application Publication No. 10-2014-0147631, entitled "Method for manufacturing thermoplastic polyurethane hot melt film", published on Dec. 30, 2014;
Patent Document 3: Korean Patent Application Publication No. 10-2015-0005092, entitled "Thermoplastic polyurethane hot melt film," published on Jan. 14, 2015);
Patent Document 4: Korean Patent No. 10-1905957, entitled "Polyurethane hot melt film and the manufacture method, published on Oct. 8, 2018;
Patent Document 5: Korean Patent No. 10-1915407, entitled "A composition of hot melt film, published on Nov. 5, 2018;
Patent Document 6: Korean Patent No. 10-1938526, entitled "Thermoplastic hot melt film with excellent adhesive strength mixed with nano-silica, published on Jan. 15, 2019; and
Patent Document 7: Korean Patent No. 10-2057036, entitled "Thermoplastic hot melt film with excellent adhesive strength mixed with nano-silica, published on Dec. 18, 2019.

EMBODIMENT OF THE INVENTION

Problems to be Solved

The purpose of this invention is to include a biomass-based thermoplastic polyurethane resin produced by reacting a chain extender and diisocyanate with a biomass-derived polyol in the range of 20-70% by weight, which is not only environmentally and human-friendly. In addition, it is possible to secure physical properties such as high heat resistance, elasticity, uniform adhesive strength, and excellent durability at the petroleum level by containing hydrophobic nano-silica, it also provides a hot melt film containing biomass-based thermoplastic polyurethane resin that can prevent overflow during the adhesion process and improve the weight and texture of the product.

An object of the present invention is to contain a biomass-based thermoplastic polyurethane resin prepared by reacting a biomass-derived polyol with a diol-based chain extender and diisocyanate in an amount of 20 to 70% by weight. And it is not only friendly to the human body, but also contains hydrophobic nano-silica to secure physical properties such as petroleum-based high heat resistance, elasticity, uniform adhesive strength, and excellent durability.

In addition, it provides a hot melt film containing a biomass-based thermoplastic polyurethane resin that can prevent overflow during the bonding process and improve the weight and feel of the product.

Means for Solving Problems

The hot melt film containing a biomass-based thermoplastic polyurethane resin according to aspect(s) of the present invention may include a biomass-based polyol produced by reacting a biomass-derived polyol with a diol-based chain extender and diisocyanate, the thermoplastic polyurethane resin composition comprising the thermoplastic polyurethane resin in a range of 20 to 70% by weight. The thermoplastic polyurethane resin composition contains hydrophobic nano-silica organically treated on the surface of nano-silica particles having a size of 1 to 100 nm in a range of 0.1 to 5 parts per hundred resin (phr). The hydrophobic nano-silica is formed in a nano-silica aggregate state having an aggregate size in a range of 100 to 1,200 nm on average, and the thermoplastic polyurethane resin composition is molded to a thickness in a range of 0.02 to 0.3 mm.

According to a preferred embodiment of the present invention, the biomass-derived polyol is one or more vegetable oil derivatives selected from any one selected from the group consisting of soybean oil, castor oil, rapeseed oil, sunflower oil, cottonseed oil, sesame, coconut oil, corn oil, peanut oil, safflower oil, and palm oil, wherein the biomass derived polyol is preparing a polyester polyol by adding an aliphatic diol to a biomass-derived dicarboxylic acid and performing an esterification reaction at a temperature of 150 to 250° C.; and b) preparing a biomass-based thermoplastic polyurethane resin by adding diisocyanate and a diol-based chain extender to the polyester polyol and reacting at a temperature of 100 to 250° C.

In addition, the aliphatic diol is at least one diol selected from ethylene glycol, 1,2-propanediol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, and tripropylene glycol. The polyester polyol has a number average molecular weight of 400 to 8,000. The hydrophobic functional group organically treated on the surface of the nano-silica particles is at least one selected from an alkyl group, a dimethyl group, a trimethyl group, a dimethyl siloxane group, and a methacryl group.

Effects of the Invention

The hot melt film containing the biomass-based thermoplastic polyurethane resin of the present invention can ensure price stability in preparation for the rise in crude oil prices by using a resource-circulating material that conforms to green technology, focusing on environmental and human-friendly characteristics.

In addition, by mixing nano-silica containing hydrophobic functional groups (lipophilic) on the particle surface, dispersibility and water resistance are improved and tensile strength is increased, so that even with a thinner hot melt film, uniform adhesive strength and superior durability than conventional products material cost is reduced while securing. Since multi-press molding, i.e., forming, is possible, there is an effect of saving energy and increasing productivity.

The hot melt film containing the biomass-based thermoplastic polyurethane resin of the present invention may maximize bonding of the hot melt film by allowing the hot melt film to be evenly distributed on the surface of the fabric without being biased to one side of the fabric due to heat and pressure, even when the yarn tissue density of the fabric is high or low or the diameter of the fabric weaving hole is large or small during press bonding (No-Sew Press). In addition, preventing the fabric from becoming hard.

Further, there is an advantage in that the product to which the hot melt film is applied may be lightweight and soft-textured.

DETAILED EMBODIMENTS

Hereinafter, a hot melt film containing a biomass-based thermoplastic polyurethane resin according to the present invention will be described, which is sufficient to allow a person of ordinary skill in the art to easily carry out the invention. It is intended to be illustrative, and does not mean that the technical spirit and scope of the present invention is limited thereto.

The hot melt film containing the biomass-based thermoplastic polyurethane resin according to the present invention is a biomass-based thermoplastic polyol produced by reacting a biomass-derived polyol with a diol-based chain extender and diisocyanate. The thermoplastic polyurethane resin composition may include the urethane resin in an amount of 20 to 70% by weight, the hydrophobic nano-silica organically treated on the surface of the nano-silica particles having a size in a range of 1 to 100 nm in the thermoplastic polyurethane resin composition contains in the range of 0.1 to 5 parts per hundred resin (phr), and the hydrophobic nano-silica is formed in a nano-silica aggregate state having a uniform aggregate size of 100 to 1200 nm on average, and the thermoplastic polyurethane resin composition is formed to a thickness of 0.02 to 0.3 mm.

The thermoplastic polyurethane resin composition as described above may include a biomass-based thermoplastic polyurethane resin prepared by reacting a diol-based chain extender and diisocyanate with a biomass-derived polyol in the range of 20~70% by weight.

The thermoplastic polyurethane resin composition as described above may include petroleum-based thermoplastic polyurethane resins produced by reacting petroleum-derived polyols with diol-based chain extenders and diisocyanates are included in the range of 30~80% by weight.

According to aspects of the present invention, in order to prevent the deterioration of physical properties due to the biomass-based thermoplastic polyurethane resin prepared from the biomass-derived polyol, it is contained within 70% by weight based on the total weight of the thermoplastic polyurethane resin composition. In addition, the thermoplastic polyurethane resin composition may include hydrophobic nano-silica organically treated on the surface of nano-silica particles having a size of 1-100 nm in the range of 0.1-5 phr.

Here, when the content of the biomass-based thermoplastic polyurethane resin contained in the thermoplastic polyurethane resin composition is less than 20% by weight, it is recognized that it is insufficient to respond to global environmental regulations such as carbon emission reduction and waste reduction policies. If it exceeds the range of 70% by weight, there is a fear that physical properties such as adhesive strength and heat resistance may be lowered, and research to supplement this is in progress.

The 'nano-silica' refers to silica particles of 100 nanometers (nm) or less in which the size of the primary particles is smaller than the micro (μm) unit, and 'nano containing organically treated hydrophobic functional groups on the surface of the particles. Silica (hydrophobic nano-silica) 'means that an organic functional group having hydrophobicity is introduced on a part or all of the surface of the nano-silica particle.

Conventional nano-silica particles have a hydrophilic surface, but the nano-silica of the present invention has excellent dispersibility because a hydrophobic organic functional group (lipophilic) is introduced through a separate surface treatment or surface modification to make the surface hydrophobic. and the water resistance of the thermoplastic hot melt film itself is reinforced to increase the tensile strength.

And 'nano-silica aggregate', which means that a plurality of nano-silica primary particles are gathered, refers to a state in which about 70% or more of the nano-silica primary particles are strongly aggregated with each other by physical and chemical action. These nano-silica aggregates are in a state in which it is difficult to further separate the nano-silica aggregates into smaller entities (nano-silica particles) in the thermosetting polyurethane resin composition for hot melt films.

According to aspects of the present invention, when manufacturing a hot melt film, by mixing nano-silica containing a hydrophobic organic functional group on the particle surface, the hot melt film is inserted between the fabric and the fabric, and when it is bonded by a press operation (No-Sew Press), when the yarn density is high or low, or the size of the weaving hole is large or small, the hot melt film is not too biased to one side of the fabric by heat and pressure, so it does not melt and it can be evenly distributed on the surface of the fabric to improve adhesion, thereby the hot melt film may be obtained.

As used herein, the expression "distributed uniformly on the surface of the fabrics" means a uniform state in which ⅓ of the hot melt film is distributed in the upper fabric, ⅓ in the lower fabric, and ⅓ between the fabrics (adhesive interface), without flowing of the hot melt film toward the fabric having a relatively low yarn density or a relatively large hole diameter after melting during no-sew pressing.

As described above, the hot melt film of the present invention is uniformly distributed on the surface of the fabric to improve adhesive strength and has no problem in adhesive strength. It is possible to secure an adhesive strength equal to or higher than that of the hot melt film.

When a hydrophobic organic functional group is introduced into the surface of the nano-silica particles contained in the hot melt film of the present invention, the dispersibility of the nano-silica is improved. It was confirmed that the cutting phenomenon that may occur due to moisture in the molding process was reduced and physical properties such as moldability were improved.

The hydrophobic organic functional group that can be introduced to the surface of the nano-silica particles may be an alkyl group, a dimethyl group, a trimethyl group, a dimethyl siloxane group, a methacryl group, or the like.

For example, the nano-silica particles used in the thermoplastic polyurethane resin composition for a hot melt film of the present invention are obtained by controlling the temperature and pressure in the fumed silica manufacturing process. to include a dimethyl group.

The nano-silica particles introduced with the hydrophobic functional group preferably may have an OH group density of 1.0 OH/nm$^3$ or less.

The density of the OH group can be measured by a known method, such as measuring the molar absorbance, c, of the OH stretching oscillation band in the organosilanol group at 3750 cm$^{-1}$ using IR spectroscopy by reacting nano-silica particles and lithium aluminium hydrohydride with hydrophobic actuators.

Nano-silica particles, in which the hydrophobic functional groups are introduced according to aspect(s) of the present invention, exist in a nano-silica aggregate state, and they are dispersed in the aggregate state that is difficult to separate separately in the thermoplastic polyurethane for yarn coating.

Preferably, the aggregates have an aggregate size of 100 to 1200 nm on average, more preferably have an average aggregate size of 200 to 500 nm.

When the size of the hydrophobic nano-silica aggregate is more than 100 nm on the average, the dispersion of nano-silica is well achieved, but when it exceeds 1200 nm, the thickening effect is reduced, a defective phenomenon may occur in a coating process using a T-die extruder. A size of the nano-silica aggregate indicates a length in a long axis direction of the nano-silica aggregate and can be measured using a scanning electron microscope (SEM).

The thermoplastic polyurethane resin used in the thermoplastic polyurethane coated yarn according to aspect(s) of the present invention is a virgin thermoplastic polyurethane, virgin TPU, which is obtained by polymerizing polyol and isocyanate as raw materials and low molecular weight glycol as a chain extender.

Examples of the polyol used herein may include any one of polyester polyol, polyether polyol, polycaprolactone polyol, and the like, and examples of the isocyanates may include any one of aromatic isocyanates and aliphatic isocyanates, and examples of low molecular weight glycols may include 1,4-butanediol and the like.

Examples of the isocyanates may include any one of aromatic isocyanates and aliphatic isocyanates, and examples of low molecular weight glycols may include 1,4-butanediol and the like.

In addition, ethylene vinyl acetate (EVA), polyamide, polyester resin, etc. can be used as a material for the hot melt film. However, it was concluded that use of a thermoplastic polyurethane resin is more effective for kneading, dispersibility, and adhesive performance with hydrophobic nano-silica according to an aspect of the present invention.

The biomass-derived polyol used for producing the biomass-based thermoplastic polyurethane resin according to aspect(s) of the present invention is at least one vegetable oil derivative selected from group consisting of soybean oil, castor oil, rapeseed oil, sunflower oil, cottonseed oil, sesame oil, coconut oil, corn oil, peanut oil, safflower oil, and palm oil. Although there is no particular limitation on the type of the specific vegetable oil, it is advantageous in terms of economy to preferably use soybean oil or castor oil.

The biomass-based thermoplastic polyurethane resin, a) adding an aliphatic diol to dicarboxylic acid derived from biomass to produce a polyester polyol by esterification reaction at a temperature of 150–250° C.; b) adding diisocyanate and a diol-based chain extender to the polyester polyol and reacting at a temperature of 100 to 250° C. to produce a biomass-based thermoplastic polyurethane resin, which is more environmentally friendly and human-friendly produced and can be applied to a variety of uses.

Aliphatic diols used in the biomass-based thermoplastic polyurethane resin polymerization process may be selected least one diol selected from among diols include ethylene glycol, 1,2-propanediol, 1,3-propanediol, 1,3-butanediol, 1,4-butanediol, and 1,5-pentanediol, 1,6-hexanediol, neopentyl glycol, diethylene glycol, triethylene glycol, tetraethylene glycol, dipropylene glycol, and tripropylene glycol.

Various types of the polyol are used according to molecular structure, molecular weight, functional group and OH-value, and have a direct effect on the physical properties of polyurethane. For example, polyurethane using polyester polyol has higher tensile strength, hardness and elongation than polyurethane using polyether polyol, and has excellent flame retardancy as well as chemical resistance and chemical resistance, so it is strong against oxidation. In addition, while it has excellent adhesion to the adherend, unlike polyether polyol, it has a hydrolysis property and thus has a weak water resistance. It is suitable to use a polyester polyol with a number average molecular weight of 400 to 8,000 to exhibit strong adhesion and good fluidity. If it is out of the above range, the viscosity, touch, and the adhesive force of the resin itself will be deteriorated.

On the other hand, in the present invention, in order to improve the adhesion and moldability of the hot melt film, nano-silica (hydrophobic nano-silica) containing a hydrophobic organic functional group on the particle surface is blended to prepare a thermoplastic polyurethane resin composition for a hot melt film. Based on the total weight of the thermoplastic polyurethane resin composition, it was confirmed that the hydrophobic nano-silica was contained in the range of 0.1 to 5 parts per hundred resin (phr) and the thickness of the film could be manufactured to about 0.02 mm to 0.3 mm.

As a method of blending the hydrophobic nano-silica, nano-silica is mixed with the raw material during polymerization of the TPU resin and then polymerized to prepare a thermoplastic polyurethane resin for a hot melt film, Alternatively, there is a method of preparing a master batch using nano-silica and then mixing it with a TPU resin to prepare a thermoplastic polyurethane resin for a hot melt film.

In the present invention, as a result of mixing and applying hydrophobic nano-silica having a size of 100 nm or less to prepare a hot melt film, it was confirmed that the adhesive strength was improved even when a small amount of 0.1 phr or more was added, and the content of the nano-silica when it exceeds 5.0 phr, the surface of the thermoplastic hot melt film becomes opaque and the adhesive strength decreases, as well as the side effect of blooming on the surface of the hot melt film as time goes by.

As described above, in the present invention, when manufacturing a hot melt film, by mixing nano-silica containing a hydrophobic organic functional group (lipophilic) on the surface, dispersibility is improved, water resistance is reinforced, and tensile strength is increased, so that the hot melt film having a thinner thickness more uniform adhesive strength than conventional products. It is possible to increase productivity by saving energy and multi-press molding while securing excellent durability and reducing material cost.

In addition, during No-Sew Press, even if the density of the fabric's yarn tissue density is high or low, or the diameter of the fabric weaving hole is large or small, the hot melt film is distributed evenly on the surface of the fabric without being melted by being biased toward one side of the fabric by heat and pressure, thereby maximizing the adhesive force of the hot melt film and preventing the fabric from becoming hard. By improving the adhesiveness, it has excellent adhesion, and in addition, it is possible to realize lightweight and soft feel of fabric products to which the hot melt film is applied.

As described above, according to aspect(s) of the present invention, in producing methods of a thermoplastic polyurethane resin composition for a hot melt film with a biomass content in a range of 20~70% may be the following:

A method of preparing a polyurethane resin composition for a hot melt film may include reacting a diol-based chain extender and diisocyanate to prepare a polyurethane resin composition for a hot melt film after mixing biomass-derived polyol and petroleum-derived polyol in a range of 20 to 70% by weight: 30 to 80% by weight, respectively. The other method of preparing a polyurethane resin composition for a hot melt film may include preparing a petroleum-based thermoplastic polyurethane resin in a range of 30 to 80% by weight produced by reacting a petroleum-derived polyol with a diol-based chain extender and diisocyanate; and mixing the biomass-based thermoplastic polyurethane resin and the petroleum-based thermoplastic polyurethane resin.

In addition, a method of preparing a hot melt film mixed with hydrophobic nano-silica including a hydrophobic organic functional group on the surface of the particles includes a method of mixing hydrophobic nano-silica with raw materials (polyols, isocyanates, glycols) used during TPU polymerization, and polymerizing to produce a hot melt film, and a method of producing a hot melt film by making a masterbatch using hydrophobic nano-silica and mixing it with TPU resin by content (see Korean Patent No. 10-2057036). A detailed description of this will be omitted.

Experimental Example 1

In order to demonstrate the effect on the TPU hot melt film prepared as described above, engineered mesh and sandwich mesh mainly used as the outer material and sandwich mesh, and the lining fabric mainly used as the lining material were used to describe the experimental results for the adhesion test in detail. In addition, for the adhesive structure and press working conditions, the TPU hot melt film is inserted between the lining fabric corresponding to the lining for the engineered mesh or sandwich mesh corresponding to the outer material, and pressing is performed at about 130° C. and 60 kgf pressure for 30 seconds. As the TPU hot melt film, a conventional TPU hot melt film and a TPU hot melt film containing hydrophobic nano-silica were used, respectively.

In [Table 1] below, as adhesion test data, the thickness of the TPU hot melt film (0.02~0.3 mm)/the content of hydrophobic nano-silica (0~5 phr)/the content of the biomass-based thermoplastic polyurethane resin (20~70% by weight), a part (-) without a numerical value in the Adhesive Strength (kgf/cm2) column of engineered mesh and sandwich mesh means that the material has been destroyed due to good adhesion.

Here, Tfb is the Flow Beginning Temperature, and MI is the Melt Index.

TABLE 1

| No | Thickness (mm) | Nano Si (phr) | Engineered mesh (kgf/cm$^2$) 20% | Engineered mesh (kgf/cm$^2$) 70 w % | Sandwich mesh (kgf/cm$^2$) 20 w % | Sandwich mesh (kgf/cm$^2$) 70 w % | Tfb (° C.) | MI (g/10 m(in) |
|---|---|---|---|---|---|---|---|---|
| 1 | 0.02 | 0 | 0.75 | 0.68 | 0.76 | 0.75 | 118.7 | 10.4 |
| 2 | 0.3 | 0 | 3.52 | 3.47 | 3.55 | 3.49 | | |
| 3 | 0.02 | 0.1 | 0.88 | 0.86 | 0.84 | 0.84 | 118.2 | 9.8 |
| 4 | 0.3 | 0.1 | 3.94 | 3.88 | 3.89 | 3.82 | | |
| 5 | 0.02 | 1 | 0.91 | 0.85 | 0.88 | 0.86 | 117.8 | 11.1 |
| 6 | 0.3 | 1 | — | 5.28 | — | 4.89 | | |
| 7 | 0.02 | 3 | 1.01 | 0.92 | 0.93 | 0.84 | 121.4 | 10.7 |
| 8 | 0.3 | 3 | — | 6.02 | 5.23 | 5.17 | | |
| 9 | 0.02 | 5 | 1.05 | 0.96 | 0.94 | 0.94 | 123.1 | 8.9 |
| 10 | 0.3 | 5 | 5.01 | 4.97 | 4.88 | 4.87 | | |

As the experimental results shown in Table 1 above, when the engineered mesh and the sandwich mesh, which are the outer material, were adhered to the lining material, which is the lining material, the TPU hot melt film (No. 3 to 10) according to aspect(s) of the present invention was obtained under the same conditions. It can be seen that the adhesive strength is increased by about 10% or more than the manufactured conventional TPU hot melt film (No. 1 to 2), and it is self-evident that the durability is further improved accordingly.

Therefore, in the present invention, when the TPU hot melt film is manufactured, the objective and effect of the present invention can be realized when the content of hydrophobic nano-silica is 0.1 to 5.0 phr (Parts per Hundred Resin) and the thickness of the film is 0.02 to 0.3 mm. It was confirmed through an experiment. However, when the content of hydrophobic nano-silica exceeds 5 phr, it was confirmed that there is a problem in that the adhesive strength is lowered, and transparency deterioration and blooming of the TPU hot melt film occurred. Note that the thickness of the TPU hot melt film, which is currently most commonly used in shoemakers, is about 0.2 mm, but in the future, clothing and bag makers will use a hot melt film of 0.1 mm or less to reduce the weight and improve the feel of the product.

According to the characteristics of the conventional TPU hot melt film, it reacts sensitively to heat and pressure during the press operation (No-Sew Press) and the flowability is rapidly accelerated. Therefore, depending on the fabric structure, it is unable to remain in the bonding interface and it is overpenetrated between the cloth and the bonding capacity does not come out well. According to aspect(s) of the present invention, by mixing the hydrophobic nano-silica, a certain amount of the TPU hot film stays on the adhesive interface, so that the adhesive strength is improved even at a thin thickness.

When nano-silica is used as a copolymer with TPU as described above, the chemical bonding and Van der Waals bonding in the urethane resin can increase, and the rheology and cohesion of the TPU can increase, leading to an increase in the bonding strength. This can eventually increase the structural adhesion. By using this hydrophobic nano-silica in the TPU hot melt film, it is possible to realize the same adhesive performance with a thinner thickness compared to the conventional TPU hot melt film, thereby reducing the cost of the resin for the TPU hot melt film and inserting the resin between the fabrics during the bonding process. It improves the overflow phenomenon of the hot melt film and may have various advantages such as excellent softness of the adhered fabric and weight reduction of the product.

Experimental Example 2

In [Table 2] below, hydrophobic nanoparticles having a thickness of 120 μm, i.e., 0.12 mm prepared through a multi-press operation of a 4-layer using a conventional T-die extruder, the average adhesive strength of the biomass-based thermoplastic polyurethane resin (20 to 70% by weight) was measured for the TPU hot melt film mixed with silica.

During the multi-press operation, it was confirmed that the adhesive strength was good, and the adhesive strength was uniformly formed on the top and bottom surfaces, which had a lot of heat transfer, and the middle layer with little heat transfer, which prevented overflow between the fabrics during the bonding process. It shows that the hot melt film exhibits uniform adhesion performance without biasing to one side.

TABLE 2

| remarks | outer material (Mesh) | Bonding strength, kgf/cm² | | | |
|---|---|---|---|---|---|
| | | lining fabric (A. NASA MM) | | lining fabric (B. NASA MM) | |
| | | 20 w % | 70 w % | 20 w % | 70 w % |
| 1-layer | Sandwich | 3.7 | 3.5 | 3.6 | 3.2 |
| | Kitten | 3.8 | 3.6 | 3.2 | 3.0 |
| | Elion | 4.6 | 4.3 | 3.3 | 3.1 |
| | CDP | 3.6 | 3.4 | 3.3 | 3.1 |
| 2-layer | Sandwich | 3.8 | 3.6 | 3.5 | 3.3 |
| | Kitten | 3.7 | 3.5 | 3.5 | 3.3 |
| | Elion | 4.3 | 4.0 | 3.4 | 3.2 |
| | CDP | 4.4 | 4.1 | 3.6 | 3.4 |
| 3-layer | Sandwich | 3.2 | 3.0 | 3.1 | 2.9 |
| | Kitten | 3.1 | 2.9 | 3.2 | 3.0 |
| | Elion | 3.2 | 3.0 | 3.0 | 2.8 |
| | CDP | 3.3 | 3.1 | 2.8 | 2.6 |
| 4-layer | Sandwich | 4.1 | 3.8 | 3.8 | 3.6 |
| | Kitten | 3.8 | 3.6 | 3.5 | 3.3 |
| | Elion | 3.5 | 3.3 | 3.3 | 3.1 |
| | CDP | 4.1 | 3.8 | 3.5 | 3.3 |

From the experimental results of [Table 1] to [Table 2], the hot melt film containing the biomass-based thermoplastic polyurethane resin prepared according to aspects of the present invention may take various forms within the scope not departing from the technical spirit of the present invention. that can be substituted, transformed and changed with.

From the experimental results of [Table 1] to [Table 2], the hot melt film containing the biomass-based thermoplastic polyurethane resin prepared according to the present invention may take various forms within the scope not departing from the technical spirit of the present invention. It can be substituted, deformed, and changed, and uniform adhesion and durability are required for sports goods, composite fiber structures, mobile device cases, electronic device housings, automobiles, and home interiors, as well as fabrics for various shoes, clothing, and bags. As a functional adhesive film for various fibers, leather, and plastic products, it can be used in various uses and forms.

In the field of fabrics for various shoes, clothing, and bags, as well as sports goods, composite fiber structures, mobile device cases, electronic device housings, automobiles, home interiors, etc. As a functional adhesive film, it can be used in various uses and forms.

What is claimed is:

1. A hot melt film containing thermoplastic polyurethane (TPU) resin, which includes biomass based TPU resin, comprising:
   wherein the thermoplastic polyurethane resin composition comprises 20 to 70% by weight of a biomass-based TPU resin produced by reacting a biomass-derived polyol with a diol-based chain extender and diisocyanate, and a hydrophobic nano-silica organically treated on the surface of nano-silica particles having a size in a range of 1 to 100 nm in a range of 0.1 to 5 parts per hundred resin (phr),
   wherein the hydrophobic nano-silica is formed in a nano-silica aggregate state having a uniform aggregate size of 100 to 1200 nm on average,
   wherein the thermoplastic polyurethane resin composition is formed into a film with a thickness in a range of 0.02-0.3 mm.

2. The hot melt film containing TPU resin of claim 1, which includes biomass based TPU resin, wherein the biomass-derived polyol is one or more vegetable oil derivatives selected from the group consisting of soybean oil, castor oil, rapeseed oil, sunflower oil, cottonseed oil, sesame oil, coconut oil, corn oil, peanut oil, safflower oil, and palm oil.

3. The hot melt film containing TPU resin of claim 1, which includes biomass based TPU resin, wherein the biomass-based TPU resin is prepared by a) adding an aliphatic diol to dicarboxylic acid derived from biomass to prepare a polyester polyol by esterification reaction at a temperature in a range of 150-250° C.; b) preparing the biomass-based TPU resin by adding diisocyanate and a diol-based chain extender to the polyester polyol and reacting at a temperature range of 100-250° C.

4. The hot melt film containing TPU resin of claim 3, which includes biomass based TPU, wherein the aliphatic diol is at least one diol selected from ethylene glycol, 1,2-propanediol, 1,3-propanediol, 1,3-butanediol, 1,4-butanediol, 1,5-pentanediol, 1,6-hexanediol, neopentyl glycol, diethylene glycol, methylene glycol, tetraethylene glycol, dipropylene glycol, and tripropylene glycol, wherein polyester polyol is the number average molecular weight in a range of 400 to 8,000.

5. The hot melt film containing TPU resin of claim 1, which includes biomass based TPU, wherein the hydrophobic functional group organically treated on the surface of the nano-silica particle is at least one or more selected from an alkyl group, a dimethyl group, a trimethyl group, a dimethyl siloxane group, and a methacryl group.

* * * * *